United States Patent
Hull et al.

(10) Patent No.: US 9,954,809 B2
(45) Date of Patent: *Apr. 24, 2018

(54) EMBEDDING AND EXECUTING COMMANDS IN MESSAGES

(71) Applicant: Microsoft Technology Licensing, LLC, Redmond, WA (US)

(72) Inventors: Mark Hull, San Jose, CA (US); Anand Kishore Bollini, Palo Alto, CA (US); Roland Schemers, Woodside, CA (US); Parag Naresh Shah, Santa Clara, CA (US); Yuichi Sasaki, San Carlos, CA (US); James Andrew Clark, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/404,034

(22) Filed: Jan. 11, 2017

(65) Prior Publication Data

US 2017/0126606 A1    May 4, 2017

Related U.S. Application Data

(63) Continuation of application No. 14/290,893, filed on May 29, 2014, now Pat. No. 9,584,454.

(Continued)

(51) Int. Cl.
*G06F 15/16* (2006.01)
*H04L 12/58* (2006.01)

(52) U.S. Cl.
CPC ............ *H04L 51/18* (2013.01); *H04L 51/046* (2013.01); *H04L 51/32* (2013.01)

(58) Field of Classification Search
CPC ........ H04L 51/18; H04L 51/046; H04L 51/32
See application file for complete search history.

(56) References Cited

U.S. PATENT DOCUMENTS 7,234,116 B2 *  6/2007  Watanabe ............ G06Q 10/107
                                                      715/752
7,555,526 B1 *  6/2009  Heidloff ............... G06Q 10/107
                                                      709/203

(Continued)

FOREIGN PATENT DOCUMENTS

WO    WO-2012125338 A1    9/2012
WO    WO-2015167703 A1    11/2015

OTHER PUBLICATIONS

"U.S. Appl. No. 14/290,893, Examiner Interview Summary dated Jul. 12, 2016", 3 pgs.

(Continued)

*Primary Examiner* — Moustafa M Meky
(74) *Attorney, Agent, or Firm* — Schwegman Lundberg & Woessner, P.A.

(57) ABSTRACT

A communication server, computer-readable storage medium and computer-implemented method for executing commands embedded in messages are provided. The method may include detecting user input of a special character while a user is composing a message and in response to detecting the user input of the special character, presenting a selectable list of command operators to the user. The method may further include causing a command operator to be included in the message in response to user selection of the command operator from the selectable list of command operators. The command operator is operative to execute an action performed by a network-based service executing on an application server. The method may further include identifying, at an outbound communication serer, the command operator (Continued)

included in the message, and transmitting a request to the application server to perform the action corresponding thereto.

20 Claims, 6 Drawing Sheets

Related U.S. Application Data (60) Provisional application No. 61/986,781, filed on Apr. 30, 2014.

(56) References Cited

U.S. PATENT DOCUMENTS

| | | |
|---|---|---|
| 9,100,355 B2 | 8/2015 | Tomkow |
| 9,241,012 B2 | 1/2016 | De Castro, Jr. et al. |
| 9,268,997 B2 | 2/2016 | Sheth et al. |
| 9,584,454 B2 * | 2/2017 | Hull ................. H04L 51/18 |
| 2003/0065738 A1 | 4/2003 | Yang et al. |
| 2009/0167767 A1 * | 7/2009 | Shoval ................. G06T 13/40 345/473 |
| 2010/0106781 A1 | 4/2010 | Gupta |
| 2013/0151631 A1 | 6/2013 | Jensen et al. |
| 2015/0036928 A1 | 2/2015 | Sheth et al. |
| 2015/0319120 A1 | 11/2015 | Hull et al. |
| 2016/0191675 A1 | 6/2016 | De Castro, Jr. et al. |

OTHER PUBLICATIONS

"U.S. Appl. No. 14/290,893, Non Final Office Action dated Apr. 8, 2016", 7 pgs.

"U.S. Appl. No. 14/290,893, Notice of Allowance dated Oct. 20, 2016", 6 pgs.

"U.S. Appl. No. 14/290,893, Response filed Jul. 8, 2016 to Non Final Office Action dated Apr. 8, 2016", 11 pgs.

"International Application Serial No. PCT/US2015/022493, International Preliminiary Report on Patentability dated Nov. 10, 2016", 9 pgs.

"International Application Serial No. PCT/US2015/022493, International Search Report dated Jun. 22, 2015", 3 pgs.

"International Application Serial No. PCT/US2015/022493, Written Opinion dated Jun. 22, 2015", 7 pgs.

"U.S. Appl. No. 14/290,893, Amendment Under 37 C.F.R. 1.312 filed Jan. 17, 2017", 6 pgs.

"U.S. Appl. No. 14/290,893, PTO Response to Rule 312 Communication dated Jan. 25, 2017", 2 pgs.

* cited by examiner

EMBEDDING AND EXECUTING COMMANDS IN MESSAGES

PRIORITY

This application is a continuation of and claims the benefit of priority under, 35 U.S.C. § 119(e) from U.S. Non-Provisional patent application Ser. No. 14/290,893, entitled "EXECUTING COMMANDS EMBEDDED IN MESSAGES," filed on May 29, 2014, which claims the benefit of U.S. Provisional Application Ser. No. 61/986,781, entitled "EXECUTING COMMANDS EMBEDDED IN MESSAGES," filed on Apr. 30, 2014, both of which are hereby incorporated by reference in their entirety.

TECHNICAL FIELD

This patent document pertains generally to data processing systems, and more particularly, but not by way of limitation, to executing commands embedded in messages.

BACKGROUND

Messaging platforms such as electronic mail (email) services, instant messaging services, and social network messaging applications allow users to exchange information through messages. Information conveyed in messages often prompts a recipient to carry out follow-up actions such as adding a task to a task list, or saving the file to a particular location. Typically, these follow-up actions must be manually performed by the user using tools, applications, and other services that are external to the messaging platform. As a result, users' productivity is decreased and time is wasted because the users must constantly toggle back and forth between multiple different tools and multiple different message platforms.

BRIEF DESCRIPTION OF DRAWINGS

Various ones of the appended drawings merely illustrate example embodiments of the present invention and cannot be considered as limiting its scope.

DETAILED DESCRIPTION

Reference will now be made in detail to specific example embodiments for caning out the inventive subject matter. Examples of these specific embodiments are illustrated in the accompanying drawings. It will be understood that they are not intended to limit the scope of the claims to the described embodiments. On the contrary, they are intended to cover alternatives, modifications, and equivalents as may be included within the scope of the disclosure. In the following description, specific details are set forth in order to provide a thorough understanding of the subject matter. Embodiments may be practiced without some or all of these specific details. In accordance with the present disclosure, components, process steps, and data structures may be implemented using various types of operating systems, programming languages, computing platforms, computer programs, and/or general purpose machines.

Aspects of the present disclosure include systems and methods to execute commands embedded in messages. The system may allow users who are composing messages to include one or more commands that may be automatically executed upon sending (or receiving) the message. Consistent with some embodiments, the system may provide users with a selectable list of predefined commands that may be used to invoke certain functionality. For example, the list may include a command that, when included in a message, automatically causes a task to be created for use with a task management service. In another example, the list may include a command that, when included in a message, automatically causes the message (or a portion thereof) to be saved in a particular directory or file within a document management system.

Consistent with some embodiments, the system may access messages routed through one or more communication servers, which are responsible for handling communications between users. The system may then parse the messages to identify commands. Upon identifying a command within a particular message, the system may transmit a request to execute the command to a network-based service capable of executing the command. As used herein, "network-based service" refers to an application executing on a server or other networked machine that provides data storage, manipulation, presentation, communication or other such capability over a network (e.g., the Internet). Such network-based services may include those services that are internal to the system as well as third party services that are external to the system. The network-based services may, for example, include services such as task management, bug or issue tracking, document management, file hosting, messaging, or content publishing.

Figure 1:
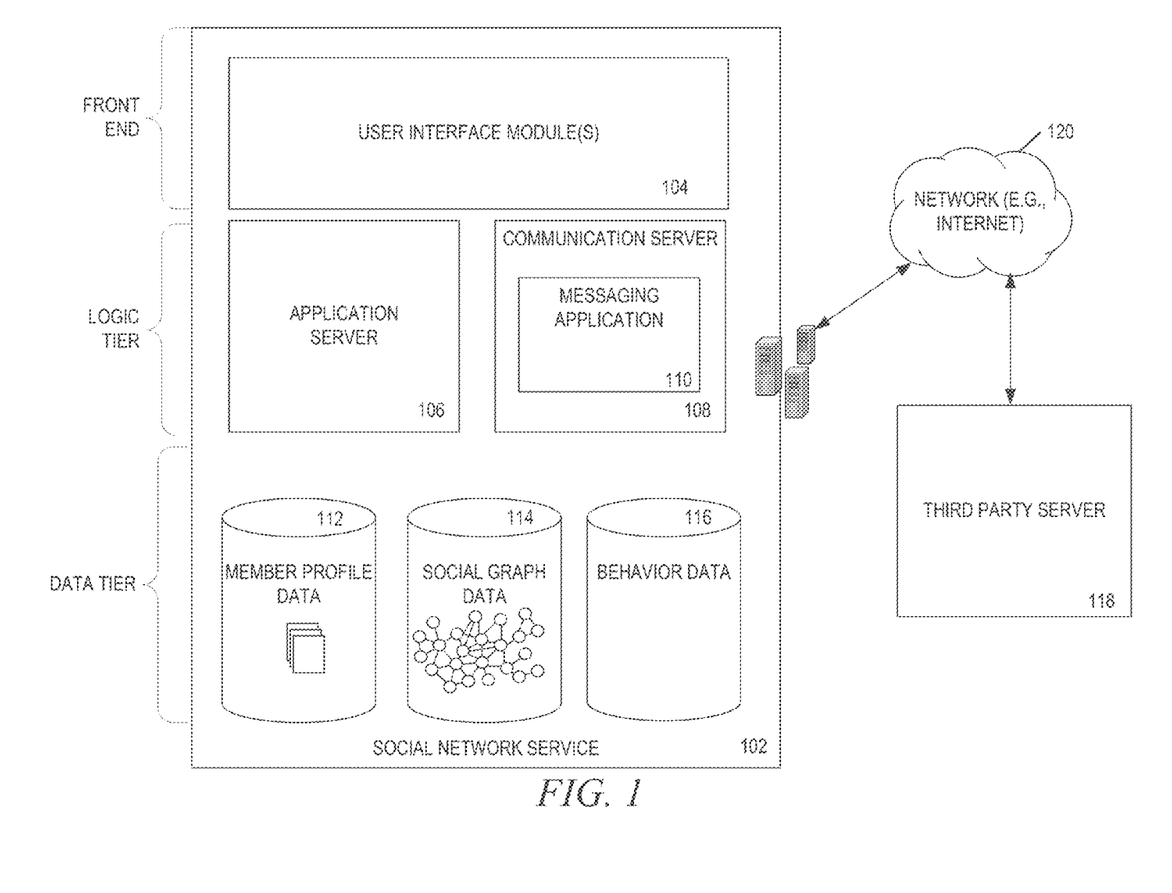
FIG. 1 is a block diagram illustrating various functional components of a social network service, according to an example embodiment.

FIG. 1 is a block diagram illustrating various functional components of a social network service 102. As shown in FIG. 1, the social network service 102 is generally based on a three-tiered architecture, consisting of a front-end tier, a logic tier, and a data tier. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be supported by a social network service 102 to facilitate additional functionality that is not specifically described herein. Furthermore, the various functional modules and engines depicted in FIG. 1 may reside on a single server computer, or may be distributed across several server computers in various arrangements. Moreover, although the social network service 102 is depicted in FIG. 1 as a three-tiered architecture, the inventive subject matter is by no means limited to such architecture. In addition, it shall be appreciated that although the various functional components of the social network service 102 are discussed in the singular sense, multiple instances of one of more of the various functional components may be employed.

As shown in FIG. 1, the front end consists of one or more user interface modules (e.g., a web server) 104, which receive requests from various client-computing devices, and communicate appropriate responses to the requesting client devices. For example, the user interface modules) 104 may receive requests from client devices in the form of Hypertext Transfer Protocol (HTTP) requests, or other web-based, application programming interface (API) requests. The client devices (not shown) may be executing conventional web browser applications, or applications that have been developed for a specific platform to include any of a wide variety of mobile devices and operating systems. The user interface module (s) 104 may also be configured to provide graphical user interface elements to prompt users for information, and to receive such information from the users.

As shown, the logic tier includes an application server 106 that may host a number of network-based services such as task management and issue ticketing and tracking, among others. The application server 106, in conjunction with the user interface module 104, generates various user interfaces (e.g., web pages) with data retrieved from various data sources in the data tier. In some embodiments, individual application servers, such as the application server 106, may be used to implement the functionality associated with various services and features of the social network service 102. For instance, the ability of an organization to establish a presence in the social graph of the social network service 102, including the ability to establish a customized web page on behalf of an individual or organization, and to publish messages or status updates on behalf of an individual or organization, may be services implemented in independent application servers 106. Similarly, a variety of other applications or services that are made available to members of the social network service 102 may be embodied in their own application servers 106. For instance, the social network service 102 is also illustrated in FIG. 1 to include a communication server 108 hosting a messaging application 110 that may provide a number of messaging services to users. As an example, the messaging application 110 may be used for generating and delivering messages to users of the social network service 102, or other external internet users. The communication server 108 may employ a number of message delivery networks and platforms to deliver messages. For example, the communication server 108 may deliver e-mail instant message (IM), push notifications, Short Message Service (SMS) messages, or other text-based electronic messages via a wired (e.g., the Internet), or wireless (e.g., mobile, cellular, WiFi, WiMax) networks.

While the communication server 108 and the messaging application 110 are shown in FIG. 1 to form part of the social network service 102, it will be appreciated that, in alternative embodiments, communication server 108 and the messaging application 110 may form part of a service that is separate and distinct from the social network service 102.

As shown in FIG. 1, the data tier includes several databases, including a member profile database 112 for storing general information contained on a social network profile, including general contact information, employer information, and educational institution information, as well as information concerning various online or offline groups. Member profile database 112 may contain information for member profiles for only a single social network profile or profiles on several different social networks. As used herein, "member" or "user" refers to an individual (e.g., a person), an entity, a business (e.g., a company), an organization, a group of people, a bot, or any combination thereof that utilizes the services provided by the social network service 102.

Consistent with some embodiments, when a person initially registers to become a member of a social network service 102, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, and so on. This information is stored, for example, in the member profile database 112. Similarly, when a representative of an organization initially registers the organization with the social network service 102, the representative may be prompted to provide certain information about the organization. This information may be stored, for example, in the member profile database 112.

Member profile database 112 may also contain contact information such as lists of contacts, previous employers, interests, organizational affiliations, and personal and professional addresses, phone numbers and websites. In some embodiments, the profile data may be processed (e.g., in the background or offline) to generate various derived profile data. For example, if a member has provided information about various job titles the member has held with the same or different companies, and for how long, this information can be used to infer or derive a member profile attribute indicating the member's overall seniority level, or seniority level within a particular company. In some embodiments, importing or otherwise accessing data from one or more externally hosted data sources may enhance profile data for both members and organizations. For instance, with companies in particular, financial data may be imported from one or more external data sources, and made part of a company's profile.

As shown in FIG. 1, the data tier also includes social graph database 114, which is a particular type of database that uses graph structures with nodes, edges, and properties to represent and store data. Of course, in various alternative embodiments, any number of other entities might be included in the social graph and, as such, various other databases may be used to store data corresponding with other entities.

Once registered, a member of social network service 102 may invite other members, or be invited by other members, to connect via the social network service 102. A "connection" may require a bilateral agreement by the members, such that both members acknowledge the establishment of the connection. Similarly, a member may elect to "follow" another member. In contrast to establishing a "connection", the concept of "following" another member typically is a unilateral operation and, at least in some embodiments, does not call for acknowledgement or approval by the member that is being followed. When one member follows another, the member who is following may receive automatic notifications about various activities undertaken by the member being followed. In addition to following another member, a user may elect to follow a company, a topic, a conversation, or some other entity. Similarly, when a member follows an organization, the member becomes eligible to receive messages or status updates published on behalf of the organization. For instance, messages or status updates published on behalf of an organization that a member is following will appear in the member's personalized data feed. For purposes of the present disclosure, the term "connection" shall include both the bilateral agreement by both members and the unilateral operation of "following". The various associations and relationships that the members establish with other members, or with other entities and objects, are stored and maintained within the social graph database 114.

The social network service 102 may also provide a broad range of other applications and services that allow members the opportunity to share and receive information, often customized or personalized to the interests of the member. For example, the social network service 102 may include a photo sharing application that allows members to upload and share photos with other members. As such, at least in some embodiments, a photograph may be a property or entity included within a social graph. Members of the social network service 102 may be able to self-organize into groups, or interest groups, organized around a subject matter or topic of interest. Accordingly, the data for a group may be stored in social graph database 114. When a member joins a group, his or her membership in the group will be reflected in the social graph data stored in the social graph database 114. In some embodiments, members may subscribe to or join groups affiliated with one or more companies. For instance, in some embodiments, members of the social network service 102 may indicate an affiliation with a company at which they are employed, such that news and events pertaining to the company are automatically communicated to the members. In some embodiments, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modeled with the social graph data of the social graph database 114.

As a member interacts with various applications, services and content made available via the social network service 102, the member's behavior (e.g., content viewed, links or buttons selected, messages responded to, etc.) may be tracked, and information concerning the member's activities and behavior may be logged or stored, for example, as indicated in FIG. 1 by behavior database 116. This information may be used to classify the member as being in various categories. For example, if the member performs frequent searches of job listings, thereby exhibiting behavior indicating that the member is a likely job seeker, this information can be used to classify the member as a job seeker. This classification can then be used as a member profile attribute for purposes of enabling others to target the member for receiving messages or status updates. Accordingly, a company that has available job openings can publish a message that is specifically directed to certain members of the social network service 102 who are job seekers, and thus more likely to be receptive to recruiting efforts. For purposes of this disclosure, the term "social data" may be used to collectively refer to the data stored in databases 112, 114 and 116.

It shall be appreciated that although FIG. 1 illustrates the data tier as including databases 112, 114, and 116, the data tier is not limited to databases 112, 114, and 116 and may include additional databases for storing various other types of data. Further, while each of the databases 112, 114, and 116 have been described as storing particular types of data, the databases 112, 114, and 116 may also store various other data and resources to support the functionality described herein.

The social network service 102 may provide an application programming interface (API) module by which third-party applications hosted by a third party server 118 may access various services and data provided by the social network service 102, consistent with some embodiments. For example, using an API, a third-party application may provide a user interface and logic that enables an authorized representative of an organization to publish messages from a third-party application to various data feeds maintained by the social network service 102. Such third-party applications may be browser-based applications, or may be operating system-specific. In particular, some third-party applications may reside and execute on one or more mobile devices (e.g., phone, or tablet computing devices) having a mobile operating system.

The third party server 118 may be coupled to a network 120, for example, via wired or wireless interfaces. The network 120 may be a LAN, a WAN, the Internet, or another packet-switched data network. Accordingly, a variety of different configurations are expressly contemplated.

Figure 2:
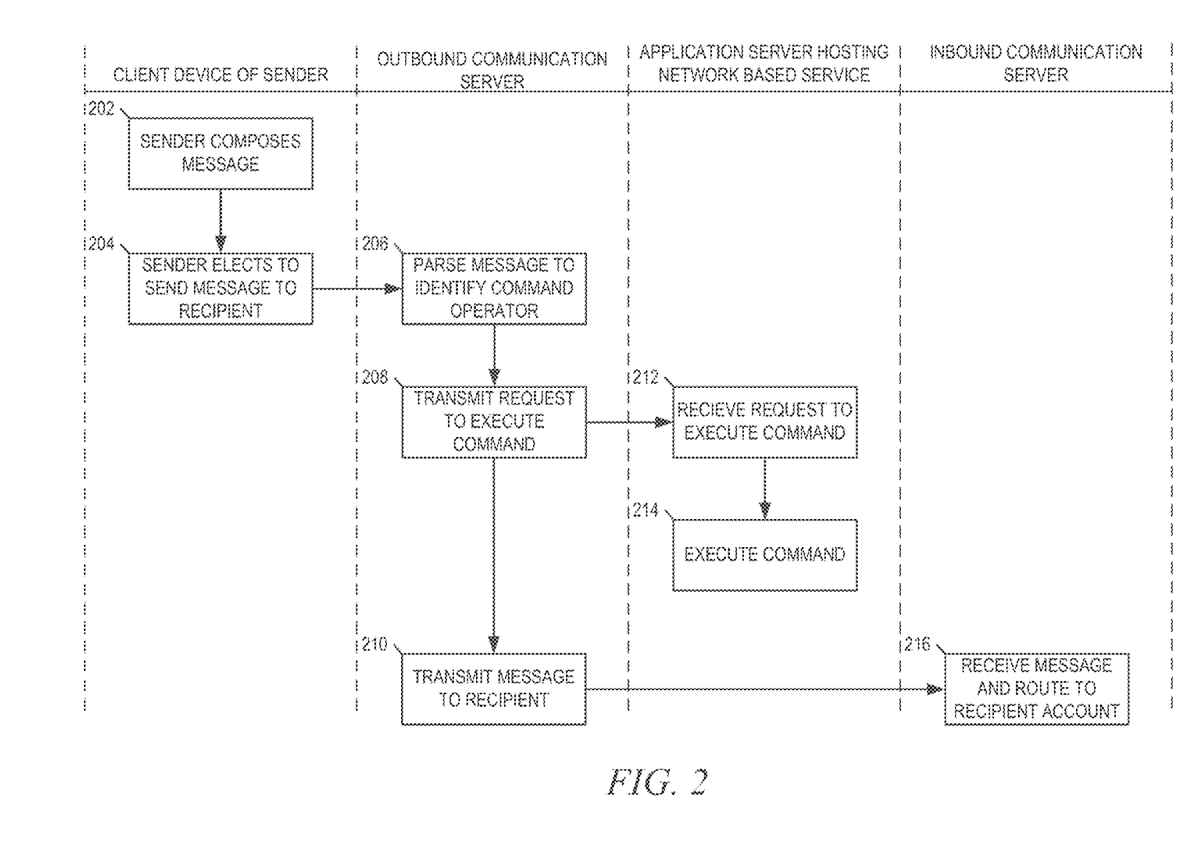
FIG. 2 is an interaction diagram depicting example exchanges between a client device, an outbound communication server, an application server, and an inbound communication server, a portion of which may be provided as part of the social network service, according to some embodiments.

FIG. 2 is an interaction diagram depicting example exchanges between a client device, an outbound communication server, an application server 106, and an inbound communication server, a portion of which may be provided as part of the social network service 102, according to some embodiments. Each of the operations discussed in reference to FIG. 2 may be embodied in computer-readable instructions for execution by one or more processors of the client device, an outbound communication server, an application server 106, and an inbound communication server, respectively. However, it shall be appreciated that the operations discussed in reference to FIG. 2 may be deployed, on various other hardware configurations and is not intended that these operations be limited to these particular devices.

At operation 202, a message sender composes a message to a message recipient using a client device communicatively coupled (e.g., over a network 120 such as the Internet to the outbound communication server. In addition to conveying information to the message recipient, the message may also include a command that when executed automatically invokes certain functionality. The command (also referred to herein as "command operator") may be a text-based phrase or keyword that is operative to invoke an action performed by a network-based service (e.g., hosted by the application server 106 or third party server 118). Each command operator may comprise a command term (e.g., a word or phrase) and, in some embodiments, a special character, or set of special characters. For example, the body of the message may include "/task" which is a command operator that, when executed (e.g., by a network-based task management service), causes a task to be created from the message and assigned to the message recipient. The action corresponding to the command operator may be related to or executed upon at least a portion of the message, or in some alternative embodiments, the action may be independent of the message and its contents. At operation 204, the message sender may elect (e.g., through appropriate user input such as selecting a "Submit" or "Send" button) to send the message to the message recipient.

At operation 206, the outbound communication server may parse the message to identify the command operator.

The parsing performed by the outbound communication server may utilize one of several known natural language processing methodologies. The outbound communication server may, for example, identify the command operator based on the use of a command term corresponding to a list of predefined command operators. Further, the use of a concatenated special character or set of special characters with the command term (e.g., "/task" "|bug|") may signal the outbound communication server that a command operator, as opposed to plain text, is included in the message.

At operation 208, the outbound communication server may transmit a request (e.g., an API call) to the application server (e.g., application server 106, or third party server 118) to execute the command. At operation 212, the application server hosting the applicable network-based service receives the request to execute the command. At operation 214, the application server executes the command. The execution of the command by the application server involves performing one or more actions (e.g., provided by the network-based service) with respect to the message. In an example, the message includes the command operator "/bug," which, when executed by the network-based service (e.g., issue ticketing service), causes an issue ticket for the message to be created and stored for follow-up and tracking. The command operator "/bug" may further cause the application server 106 to transmit a notification to appropriate personnel to notify them of the issue.

At operation 210, which may be performed in parallel with operation 208, the outbound communication server transmits the message to the message recipient (e.g., to an email address, phone number, or user account). At operation 216, the inbound communication server receives the message and routes the message to the recipient. The inbound communication server may also cause the message to be stored in a database (e.g., database 112, 114, or 116) for later retrieval.

Consistent with some embodiments, the outbound communication server, the inbound communication server, or both may correspond to the communication server 108. Further, in some alternative embodiments, the inbound communication server, as opposed to the outbound communication server, may perform operations 206 and 208 subsequent to receiving message at operation 216. In some embodiments, the communication server 108 may correspond to an email server.

Figure 3:
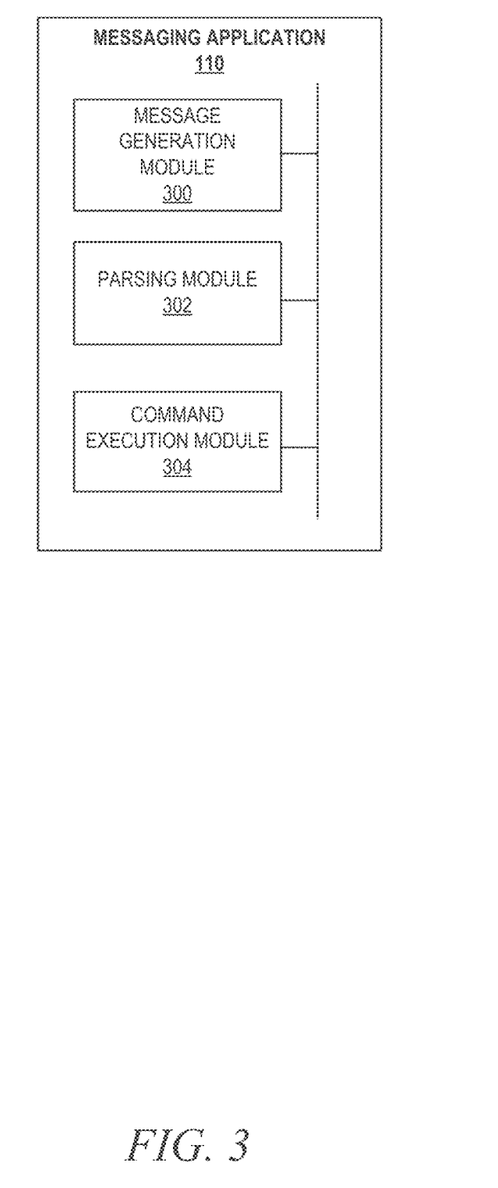
FIG. 3 is a block diagram illustrating various functional modules that form a messaging application, which is provided as part of the social network service, according to an example embodiment.

FIG. 3 is a block diagram illustrating various functional modules that form the messaging application 110, according to an example embodiment. In particular, the messaging application 110, as illustrated in FIG. 3, includes a message generation module 300, a parsing module 302, and a command execution module 304, all configured to communicate access and share common data) with each other (e.g., via a bus, a shared memory, a network, or a switch). The modules 300, 302, and 304, may furthermore access the databases 112, 114 and 116 illustrated in FIG. 1 as well as any other database communicatively coupled to the social network service 102. Any of these modules may be implemented using hardware, software executed by general purpose or special purpose hardware, or instructions stored on a computer readable medium that is operative to perform the methodologies discussed herein. Moreover, any two or more of these modules may be combined into a single module, and the functions described herein for a single module may be subdivided among multiple modules. It shall be appreciated that although the various functional components of messaging application 110 are discussed in the singular sense, multiple instances acme of more of various functional components may be employed.

The message generation module 300 may enable users to generate messages to be exchanged with other users. As such, the message generation module 300 may work in conjunction with the user interface module(s) 104 to provide users with a graphical user interface (GUI) for message generation that provides users with the ability to compose messages and address them to one or more recipient users. In some instances, such GUIs may further provide users the ability to attach or embedded content items such as images or videos to messages.

Consistent with some embodiments, the message generation module 300 may assist users in including command operators in messages so that certain actions may be automatically performed in response to a message being sent. To this end, the message generation module 300 may, in conjunction with the user interface module(s) 104, provide users with a selectable list (e.g., a dropdown menu) of a predefined set of command operators. The selectable list of predefined command operators may be displayed in conjunction with the message generation GUI in a separate window or frame. In some embodiments, the selectable list of predefined command operators may be displayed to a user in response to the user entering a special character (e.g., "/") associated with command operators while composing a message within the message generation GUI. Upon receiving a selection of a command operator from a user, the message generation module 300 may cause the command operator to be inserted in the message without the user having to manually enter the characters of the command operator. The command operators included in the list may correspond to respective actions performed by a network-based service. Further, command operators corresponding to actions provided by various different network-based services may be included in the list. For example, the list may include a command operator corresponding to an action performed by a network-based task management service and another command operator corresponding to network-based issue tracking service.

The parsing module 302 may be configured to detect in inclusion of one or more command operators in messages. To this end, the parsing module 302 may parse incoming and outgoing messages according to one of many known natural language processing techniques. Consistent with some embodiments, the identification of a command operator may include detecting the use of a special character such as "/" or "*" in conjunction with the command term, which indicates to the parsing module 302 that a command operator, as opposed to plain text, is included in the message. The parsing module 302, may further detect the inclusion of a command term that is used in conjunction with the special character(s). The identification of the command term may be based on a comparison of the terms used in a message with a list of command terms that are linked to known command operators.

The command execution module 304 may be configured to cause the execution of commands identified by the parsing module 302. Each command operator may correspond to an action provided by one of multiple network-based services. Network-based services may be hosted by the application server 106 forming part of the social network service 102, or may alternatively be hosted by a third party server 118. As such, the operation of executing commands performed by the command execution module 304 may include transmitting one or more requests to the application server 106 or third party server 118 hosting the network-based service to perform the action corresponding to the command. The request may also include contextual information such as a timestamp, geo-location data, a device identifier, and a user identifier, among other information. Consistent with some embodiments, such requests may correspond to API calls (e.g., to an API server providing programmatic access to the application server 106 or third party server 118) to invoke functionality of the network-based service. The command execution module 304 may therefore be configured to generate various API calls and to format each API call according to conventions of the APIs of the applicable network-based service. For example, the command execution module 304 may format each API call to include the specific parameters needed by the API of the applicable network-based service to carry out the action specified by the command operator.

Figure 4:
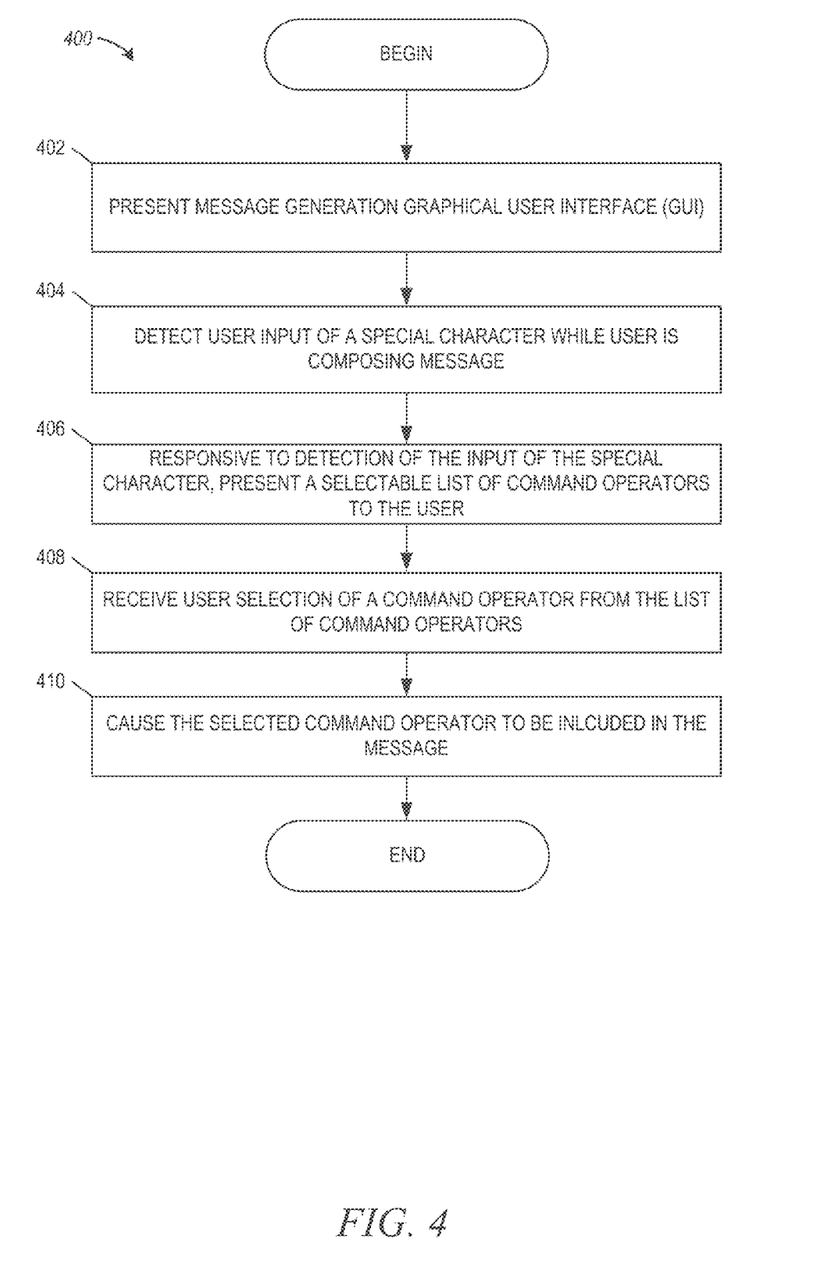
FIG. 4 is a flowchart illustrating a method for providing message generation services, according to an example embodiment.

FIG. 4 is a flowchart illustrating a method 400 for providing message generation services, according to an example embodiment. The method 400 may be embodied in computer-readable instructions for execution by one or more processors such that the method 400 may be carried out in whole or in part by the communication server 108. In particular, the method 400 may be carried out by the messaging application 110, and accordingly, the method 400 is described below by way of example with reference thereto. However it shall be appreciated that the method 400 may be deployed on various other hardware configurations and is not intended to be limited to the communication server 108.

At operation 402, the message generation module 300 may present (or cause presentation of) a message generation GUI on a client device of a user of the social network service 102. The message generation GUI provides the user with the ability to compose one or more messages and address or direct (e.g., using an email address, phone number, or user profile) them to one or more recipient users. In some instances, such GUIs may further provide users the ability to attach or embedded content items such as images or videos to messages.

At operation 404, the message generation module 300 may detect user input of a special character (e.g., "/" or "*") while the user is composing a message. The special character may be anon-alphanumeric character that is linked to command operators, and as such, the input of the special character signals the message generation module 300 that the user intends to include a command operator in the message. Consistent with some embodiments, the special character may also be used while processing the message to signal the parsing module 302 that a command operator is included in the message.

Responsive to detection of the user inputting the special character, the message generation module 300 may present (or cause presentation of) a selectable list of command operators to the user, at operation 406. The list ref command operators may include each command operator available for use with the messaging application 110. Each command operator included in the list of command operators may be operative to invoke an action performed by a network-based service. Further, the list of command operators may include actions that are performed by multiple different network-based services that may be either internal (e.g., executing on the application server 106) or external (e.g., executing, on the third party server 118) to the social network service 102. In an example, a command operator such as "/task" may be used for creating a task from the message for use within a task management system. In another example, a command operator such as "/everyone" may be used for sending a push notification to one or more message recipients about or announcing the message. In this example, the command operator may override settings of the one or more users that dictate that push notification not be received. In yet another example, a command operator such as "/encrypt" may be used to encrypt the message. In still another example, a command operator such as "/bug" may be used to create a bug or issue tracking report (also referred to as a "bug fix ticket") to track the status of a bug or other known issue with an application or tool.

At operation 408, the message generation module 300 may receive a user selection of a command operator from the list of command operators. At operation 410, the message generation module 300 may cause the selected command operator to be included in the message. In this manner, the command operator is included in the message without the user having to enter in each character of the command operator. It shall be appreciated that in other embodiments, a user may manually input a command operator without having to select the command operator from the selectable list of command operators.

Figure 5:
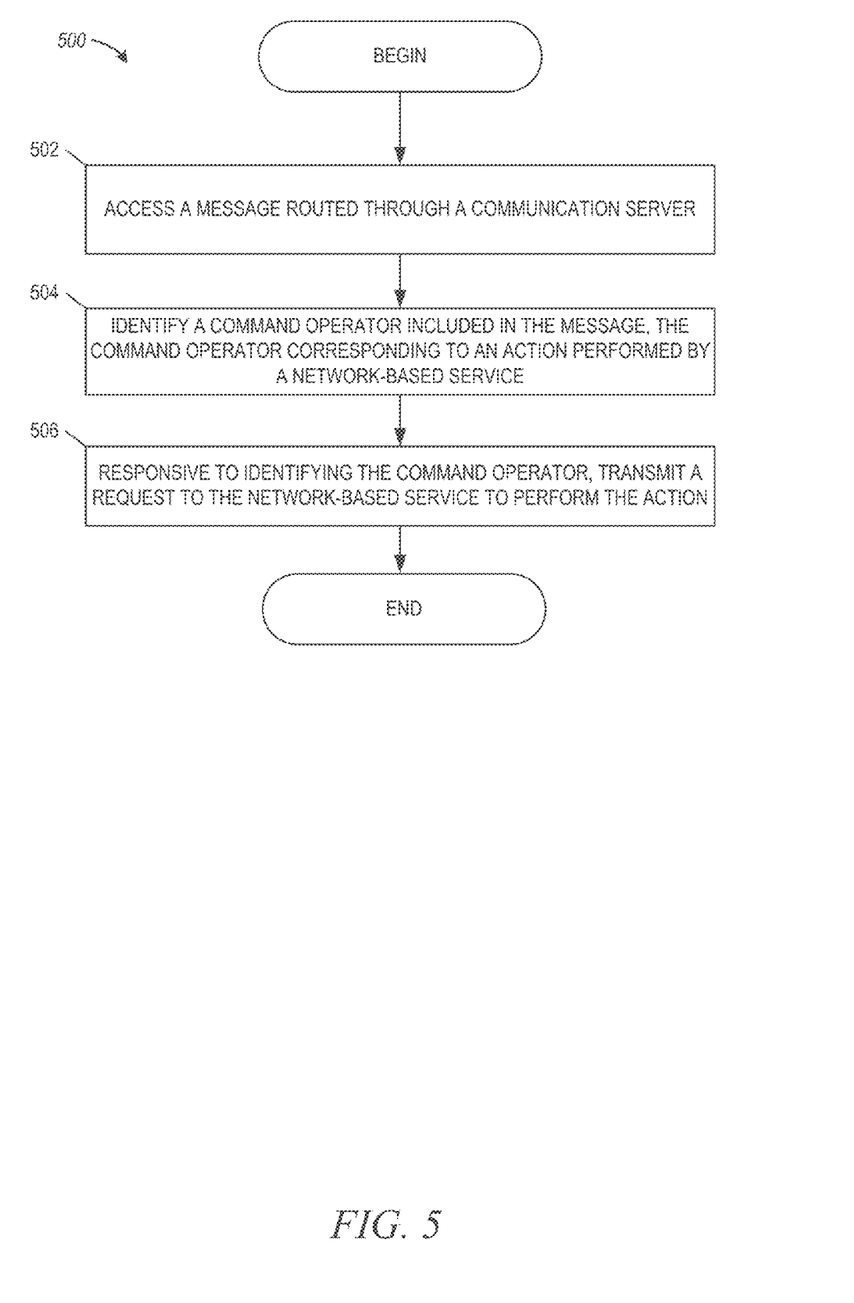
FIG. 5 is a flowchart illustrating a method for executing a command embedded in a message, according to an example embodiment.

FIG. 5 is a flowchart illustrating a method 500 for executing a command embedded in a message, according to an example embodiment. The method 500 may be embodied in computer-readable instructions for execution by one or more processors such that the method 500 may be carried out in whole or in part by the communication server 108. In particular, the method 500 may be carried out by the messaging application 110, and accordingly, the method 500 is described below by way of example with reference thereto. However, it shall be appreciated that the method 500 may be deployed on various other hardware configurations and is not intended to be limited to the communication server 108.

At operation 502, the parsing module 302 may access a message routed through the communication server 108. The communication server 108 through which the message is routed may be the outbound or the inbound communication server. The message may be any one of a varied of message types including, for example, an email, an IM, an SMS message, or other text based message.

At operation 504, the parsing module 302 may identify a command operator included in the message. The command operator is a text string comprising a command term and, in some embodiments, one or more special characters. The command operator corresponds to an action performed by a network-based service. The command operator may be identified by parsing the message (e.g., according to natural language processing) and identifying a known command term that may, in some embodiments, be used in conjunction with one or more special characters. The network-based service may be executing on the application server 106 of the social network service 102, or a third party server 118. In some embodiments, the action may be an action performed on or using the message itself, while in some alternative embodiments, the action is independent of the message. The action may, for example, correspond to creating a task for use with a task management system, sending a push notification, encrypting the message, creating an issue or bug fix ticket, publishing content, or storing the message or a portion of its contents in a particular location (e.g., a file or directory) of an electronic document management system or file hosting service.

At operation 506, responsive to identifying the command operator (e.g., performed by the parsing module 302), the command execution module 304 may transmit a request to the network-based service to perform the action. The request may correspond to an API call or series of API calls made to an API provided by the network-based service. The transmitting of the request may include information the request according to the conventions of the network-based service corresponding to the command operator. Consistent with some embodiments, the request may provide the network-based service with contextual information such as a timestamp, geo-location data, a device ID, a user ID, or any combination thereof.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein tray be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network 120 (e.g., the Internet) and via one or more appropriate interfaces (e.g., application program interfaces (APIs)).

Example embodiments may be implemented in digital electronic circuitry, in computer hardware, firmware, or software, or in combinations of these. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network 120. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Figure 6:
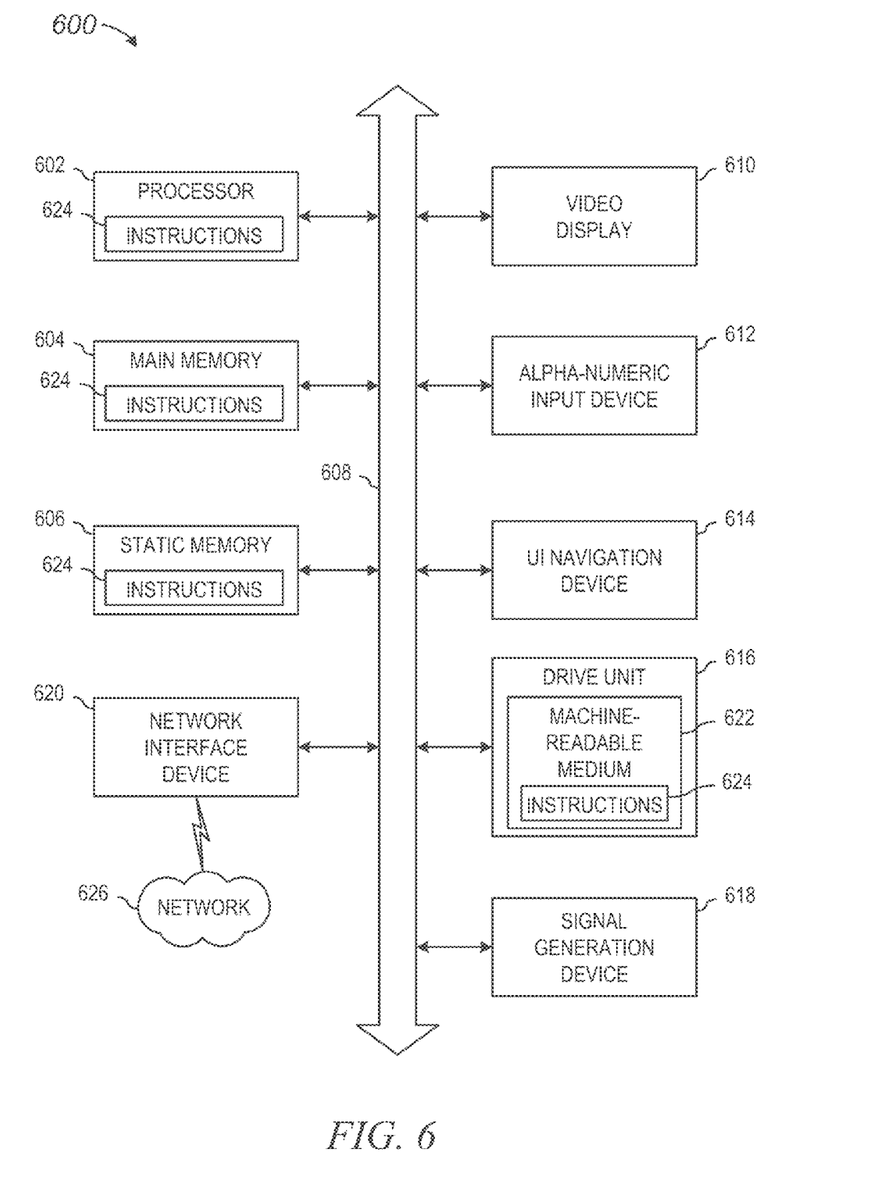
FIG. 6 is a block diagram of machine in the example than of a computer system within which a set of instructions may be executed for causing the machine to perform any one or more of the methodologies discussed herein.

FIG. 6 is a block diagram of machine in the example form of a computer system 600 within which instructions may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display 610 (e.g., a liquid crystal display (LCD) or a cathode ray tube (CRT)). The computer system 600 may also include an alphanumeric input device 612 (e.g., a keyboard), a user interface (UI) navigation device 614 (e.g., a mouse), a disk drive unit 616, a signal generation device 618 (e.g., a speaker) and a network interface device 620.

The disk drive unit 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media 622.

While the machine-readable medium 622 is shown in an example embodiment to be a single medium the term "machine-readable medium" may include a single medium or multiple media (e.g., a centralized or distributed database, and/or associated caches and servers) that store the one or more instructions 624 or data structures. The term "machine-readable medium" shall also be taken to include any tangible medium that is capable of storing, encoding or carrying instructions (e.g., the instructions 624) for execution by the computer system 600 and that cause the computer system 600 to perform any one or more of the methodologies of the present inventive subject matter, or that is capable of storing, encoding or carrying data structures utilized by or associated with such instructions 624. The term "machine-readable medium" shall accordingly be taken to include, but not be limited to, solid-state memories, and optical and magnetic media. Specific examples of machine-readable media 622 include non-volatile memory, including by way of example semiconductor memory devices, e.g., erasable programmable read-only memory (EPROM), electrically erasable programmable read-only memory (EEPROM) and flash memory devices magnetic disks such as internal hard disks and removable disks; magneto-optical disks; and CD-ROM and DVD-ROM disks.

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., Wifi and WiMax networks). The term "transmission medium" shall be taken to include any intangible medium that is capable of encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter ma be referred to herein, individually and/or collectively, by the term "invention" merely for convenience and without intending to voluntarily limit the scope of this application to any single invention or inventive concept if more than one is in fact disclosed. Thus, although specific embodiments have been illustrated, and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
detecting user input of a special character while a user is composing a message for transmission to one or more devices of a recipient;
in response to detecting the user input of the special character, presenting a selectable list of command operators to the user;
causing a command operator to be included in the message in response to user selection of the command operator from the selectable list of command operators, the command operator corresponding to an action to be performed by a network-based service;
identifying, by a processor of an outbound communication server, the command operator included in the message; the message being routed through the outbound communication server for transmission to the one or more devices of the recipient; and
responsive to identifying the command operator in the message, transmitting; from the outbound communication server, a request to an application server executing the network-based service to perform the action corresponding to the command operator.

2. The method of claim 1, wherein the identifying of the command operator included in the message comprises parsing the message according to natural language processing.

3. The method of claim 1, wherein the identifying of the command operator included in the message includes detecting at least the special character included in the message.

4. The method of claim 1, wherein the message is an electronic mail (email) message.

5. The method of claim 1, further comprising transmitting, at the outbound communication server, the message to the one or more devices of the recipient.

6. The method of claim 1, wherein the application server executing the network-based service corresponds to a third-party.

7. The method of claim 1, wherein the request comprises one or more application programming interface (API) calls to the network-based service.

8. The method of claim 7, wherein the transmitting the request to the application server includes formatting the API call according to conventions of the network-based service.

9. The method of claim 8, wherein the identifying of the command operator included in the message comprises comparing the command term with a list of command terms corresponding to a plurality of command operators.

10. The method of claim 1, wherein the command operator is a text string including a command term.

11. The method of claim 1, wherein the action is creating a task from the message for a user in a task management platform.

12. The method of claim 1, wherein the action is sending a push notification to one or more users.

13. The method of claim 1, wherein the action includes storing at least a portion of information included in the message in a particular location of a document management system.

14. The method of claim 1, wherein the action includes creating a bug fix ticket.

15. A communication server comprising:
one or more processors of a machine;
a machine-readable storage medium having no transitory signals and embodying instructions that, when executed by the one or more processors, cause the machine to perform operations comprising:
detecting user input of a special character while a user is composing a message for transmission to one or more devices of a recipient;
in response to detecting the user input of the special character presenting a selectable list of command operators to the user;
causing a command operator to be included in the message in response to user selection of the command operator from the selectable list of command operators, the command operator corresponding to an action to be performed by a network-based service;
identifying, by a processor of an outbound communication server, the command operator included in the message, the message being routed through the outbound communication server for transmission to the one or more devices of the recipient; and
responsive to identifying the command operator in the message, transmitting, from the outbound communication server, a request to an application server executing the network-based service to perform the action corresponding to the command operator.

16. The system of claim 15, wherein identifying the command operator performed by the parsing module comprises:
parsing the message according to natural language processing;
detecting the special character in the message; and
determining the special character is used in conjunction with a command term corresponding to the command operator.

17. The system of claim 15, wherein the outbound message is an instant message (IM).

18. The system of claim 15, wherein the network-based service is provided by a third party; and wherein the transmitting of the request to the application server executing the network-based server includes transmitting one or more API calls to the application sever to perform the action.

19. The system of claim 15, wherein the selectable list of command operators is displayed in conjunction with graphical user interface (GUI) for generating the message.

20. A machine-readable storage medium having no transitory signals and embodying instructions that, when executed by a machine; cause the machine to perform operations comprising:
detecting user input of a special character while a user is composing a message for transmission to one or more devices of a recipient;
in response to detecting the user input of the special character, presenting a selectable list of command operators to the user;
causing a command operator to be included in the message in response to user selection of the command operator from the selectable list of command operators, the command operator corresponding to an action to be performed by a network-based service;
identifying, by a processor of an outbound communication server, the command operator included in the message, the message being routed through the outbound communication server for transmission to the one or more devices of the recipient; and
responsive to identifying the command operator in the message, transmitting, from the outbound communication server, a request to an application server executing the network-based service to perform the action corresponding to the command operator.

\* \* \* \* \*

UNITED STATES PATENT AND TRADEMARK OFFICE
CERTIFICATE OF CORRECTION

PATENT NO. : 9,954,809 B2
APPLICATION NO. : 15/404034
DATED : April 24, 2018
INVENTOR(S) : Hull et al.

It is certified that error appears in the above-identified patent and that said Letters Patent is hereby corrected as shown below:

On the Title Page

In item (57), in "Abstract", in Column 2, Line 2, after "medium", insert --.--

In item (57), in "Abstract", in Column 2, Line 14, delete "serer," and insert --server,-- therefor On page 2, in Column 2, under "Other Publications", Line 8, delete "Preliminiary" and insert --Preliminary-- therefor In the Claims In Column 15, Line 19, in Claim 1, delete "message;" and insert --message,-- therefor

In Column 15, Line 23, in Claim 1, delete "transmitting;" and insert --transmitting,-- therefor In Column 16, Line 7, in Claim 15, after "character", insert --,--

In Column 16, Line 38, in Claim 18, delete "party;" and insert --party,-- therefor In Column 16, Line 47, in Claim 20, delete "machine;" and insert --machine,-- therefor Signed and Sealed this
Fourth Day of June, 2019

Andrei Iancu
*Director of the United States Patent and Trademark Office*